(12) United States Patent
Iwazaki et al.

(10) Patent No.: US 7,103,461 B2
(45) Date of Patent: Sep. 5, 2006

(54) DRIVING ASSIST APPARATUS AND METHOD FOR VEHICLE

(75) Inventors: Katsuhiko Iwazaki, Suntou-gun (JP); Hisashi Satonaka, Susono (JP); Yuichi Kubota, Okazaki (JP); Tomohiko Endo, Toyota (JP); Akira Matsui, Toyota (JP); Hideyuki Iwakiri, Tajimi (JP); Toru Sugiyama, Toyota (JP); Seiji Kawakami, Susono (JP); Hiroaki Kataoka, Susono (JP); Yuu Tanaka, Aichi-gun (JP); Yoshifumi Iwata, Anjo (JP)

(73) Assignees: Toyota Jidosha Kabushiki Kaisha, Toyota (JP); Aisin Seiki Kabushiki Kaisha, Kariya (JP)

(*) Notice: Subject to any disclaimer, the term of this patent is extended or adjusted under 35 U.S.C. 154(b) by 5 days.

(21) Appl. No.: 10/871,032

(22) Filed: Jun. 21, 2004

(65) Prior Publication Data

US 2005/0027415 A1 Feb. 3, 2005

(30) Foreign Application Priority Data

Jun. 26, 2003 (JP) .............................. 2003-183095

(51) Int. Cl.
*G06F 19/00* (2006.01)
(52) U.S. Cl. .......................................... 701/41; 701/23
(58) Field of Classification Search .................... None
See application file for complete search history.

(56) References Cited

U.S. PATENT DOCUMENTS 4,931,930 A 6/1990 Shyu et al.
6,070,684 A 6/2000 Shimizu et al.
6,826,469 B1 * 11/2004 Iwata et al. .................. 701/93
2001/0026317 A1 10/2001 Kakinami et al.

FOREIGN PATENT DOCUMENTS

| DE | 100 30 449 A1 | 1/2001 |
| DE | 199 40 007 A1 | 3/2001 |
| EP | 1 238 892 A2 | 9/2002 |
| JP | A 10-278825 | 10/1998 |
| JP | 2001-1929 | * 1/2001 |
| WO | WO 2004/050458 A1 | 6/2004 |

OTHER PUBLICATIONS

U.S. Appl. No. 10/870,919, filed Jun 21, 2004, Iwazaki et al.
U.S. Appl. No. 10/871,013, filed Jun. 21, 2004, Iwazaki et al.
U.S. Appl. No. 10/871,010, filed Jun. 21, 2004, Iwazaki et al.

* cited by examiner

*Primary Examiner*—Michael J. Zanelli
(74) *Attorney, Agent, or Firm*—Oliff & Berridge, PLC.

(57) ABSTRACT

A driving assist apparatus and method for a vehicle capable of guiding the vehicle at appropriate vehicle speed in accordance with the path is provided. The alarm vehicle speed for informing a driver of overspeed during driving assist is set lower for a changing steer region than for a fixed steer region. The lower alarm vehicle speed is set before the changing steer region is entered. Therefore, in the changing steer region, the vehicle speed can be sufficiently reduced, so that a set amount of steering can be accomplished. In the fixed steer region, the vehicle speed can be increased so as to reduce the time of travel.

17 Claims, 9 Drawing Sheets

DRIVING ASSIST APPARATUS AND METHOD FOR VEHICLE

INCORPORATION BY REFERENCE

The disclosure of Japanese Patent Application No. 2003-183095 filed on Jun. 26, 2003, including the specification, drawings and abstract is incorporated herein by reference in its entirety.

BACKGROUND OF THE INVENTION

1. Field of the Invention

The invention relates to vehicular driving assist apparatus and method for determining a locus of run to a target position and assisting the driving of a vehicle so that the vehicle follows the locus of run.

2. Description of the Related Art

A related-art technology for guiding a vehicle to a target position through the use of the automatic steering, the steering command, etc., is disclosed in, for example, Japanese Patent Application Laid-Open Publication No. 10-278825. In this related technology, a reference amount of operation of a brake pedal is pre-set in order to adjust the vehicle speed in accordance with the response speed of a steering actuator during the automatic steering. A deviation between the reference amount of operation and the actual amount of operation caused by the driver is calculated, and is indicated to the driver. Therefore, the vehicle speed is prevented from becoming excessively high and low, so that appropriate automatic parking control becomes possible.

In this technology, the vehicle speed is uniformly set. However, in an actual control, the vehicle speed in the case where the steering angle is changed by driving the steering actuator and the vehicle speed in the case where the steering angle is maintained do not need to be the same If the vehicle speed is uniformly set, there is a possibility that the driving to a target position may consume an inconveniently long time or that sufficient vehicle speed cannot be obtained despite a driver's desire for increased speed and thus controllability may become low.

SUMMARY OF THE INVENTION

As forms of the invention, driving assist apparatus and method for a vehicle described below are provided. The driving assist apparatus includes: a computing portion that computes a path that extends from an initial position of the vehicle to a target position of the vehicle and that includes a changing steer region where a steering angle is changed and a fixed steer region where the steering angle is fixed; an automatic steering portion that execute automatic steering of the vehicle in order to guide the vehicle along the path to the target position; an alarm device that gives an alarm to a driver if a vehicle speed exceeds a predetermined alarm vehicle speed during an operation of the automatic steering portion; and an alarm vehicle speed setting portion that sets the alarm vehicle speed, wherein the alarm vehicle speed setting portion sets the alarm vehicle speed higher for the fixed steer region than for the changing steer region.

The driving assist method includes the steps of: computing a path that extends from an initial position of the vehicle to a target position of the vehicle and that includes a changing steer region where a steering angle is changed and a fixed steer region where the steering angle is fixed; executing automatic steering of the vehicle in order to guide the vehicle along the path to the target position; giving an alarm to a driver if a vehicle speed exceeds a predetermined alarm vehicle speed during an operation of the automatic steering portion; and setting the alarm vehicle speed, wherein the alarm vehicle speed is set higher for the fixed steer region than for the changing steer region.

According to the driving assist apparatus and method, different alarm vehicle speeds are set for the fixed steer region and the changing steer region. In the changing steer region where a driving device of the automatic steering device drives a steering system, the alarm vehicle speed is set relatively low. Therefore, the load on the driving device is reduced, and high-accuracy steering is realized. Furthermore, in the fixed steer region where the driving device does not drive the steering system, the alarm vehicle speed is set relatively high so as to allow movement at a higher speed than in the changing steer region. Therefore, the time of travel to the target position can be reduced. Due to the changing of the alarm vehicle speed in accordance with the path, controllability improves.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

In the following description, the present invention will be described in more detail in terms of exemplary embodiments.

Figure 1:
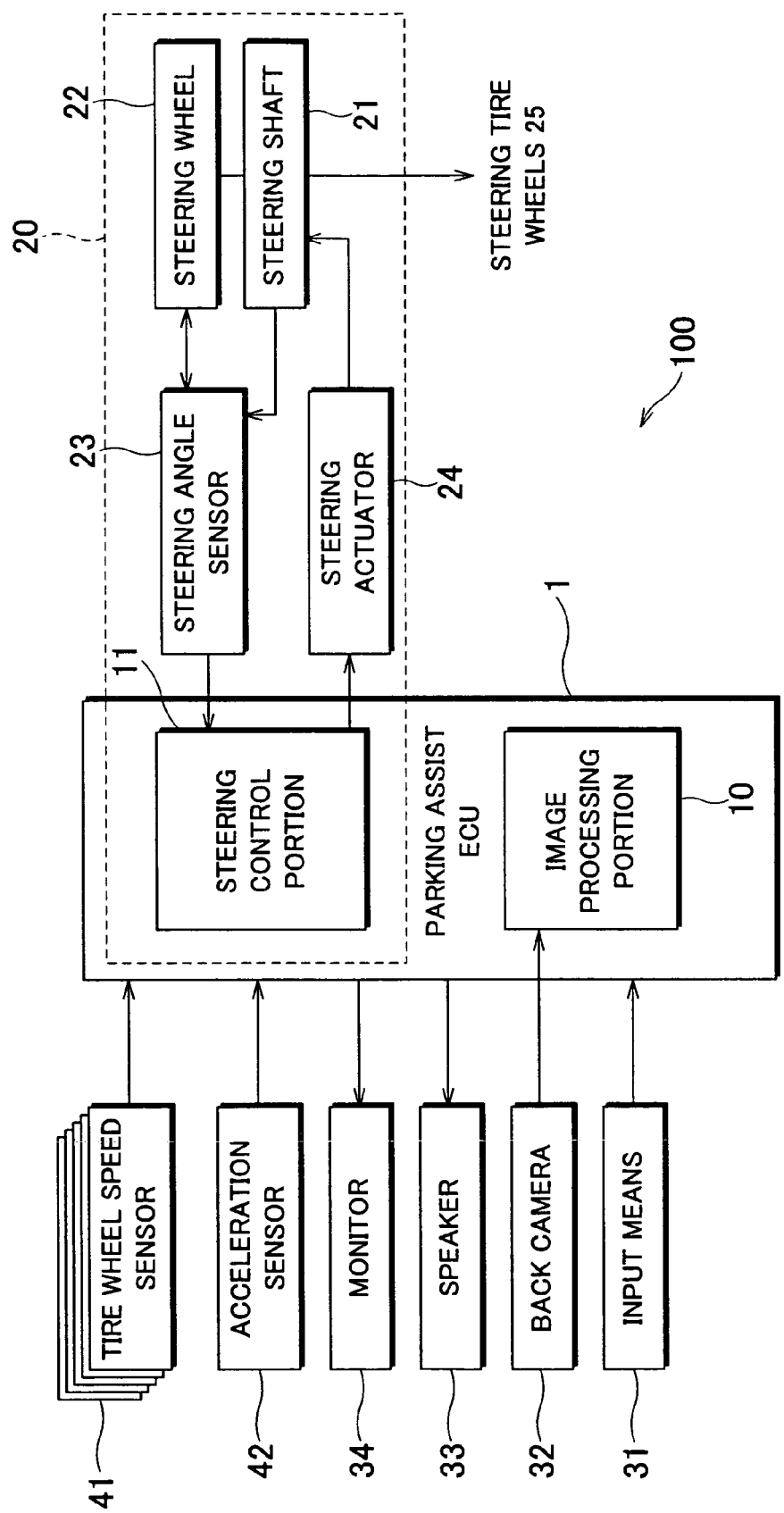
FIG. 1 is a block diagram illustrating the construction of a parking assist apparatus 100 in accordance with an embodiment of the invention.

A driving assist apparatus in accordance with the invention will be described below with reference to a parking assist apparatus as an example. FIG. 1 is a block diagram illustrating the construction of a parking assist apparatus 100 in accordance with an embodiment of the invention. The parking assist apparatus 100 has an automatic steering device 20, and is controlled by a parking assist ECU 1 that is a control device. The parking assist ECU 1 is formed by a CPU, a ROM, a RAM, an input signal circuit, an output signal circuit, a power supply circuit, etc. Furthermore, the parking assist ECU 1 has an image processing portion 10 that processes images acquired via a back camera 32 described below, and a steering control portion 11 that controls an automatic steering device 20. The image processing portion 10 and the steering control portion 11 may be separate from each other in terms of hardware within the parking assist ECU 1, or may be separate in terms of software while sharing the CPU, the ROM, the RAM, etc. that are provided in the parking assist ECU 1.

A steering angle sensor 23 for detecting the amount of steer of a steering shaft 21 that transfers the movement of a steering wheel 22 to steering tire wheels 25, and a steering actuator 24 that provides steering force are connected to the steering shaft 21. In addition to providing a steering force during an automatic steering mode, the steering actuator 24 may serve as a power steering device that provides an assist steering force while a driver is steering. The steering control portion 11 controls the driving of the steering actuator 24.

The steering control portion 11 receives an output signal of the steering angle sensor 23, and also receives output signals of tire wheel speed sensors 41 that are provided for the individual tire wheels for detecting the rotation speeds thereof and an output signal of an acceleration sensor 42 that detects the acceleration of the vehicle.

The aforementioned image processing portion 10 receives an image signal, that is, an output signal of the back camera 32 disposed at a rear portion of the vehicle for acquiring mages in a rearward direction. The image processing portion 10 is connected to input means 31 for accepting a driver's input operation in conjunction with the parking assist, a monitor 34 for displaying information in the form of images to a driver, and a speaker 33 for presenting information in the form of sounds and voices.

Figure 2:
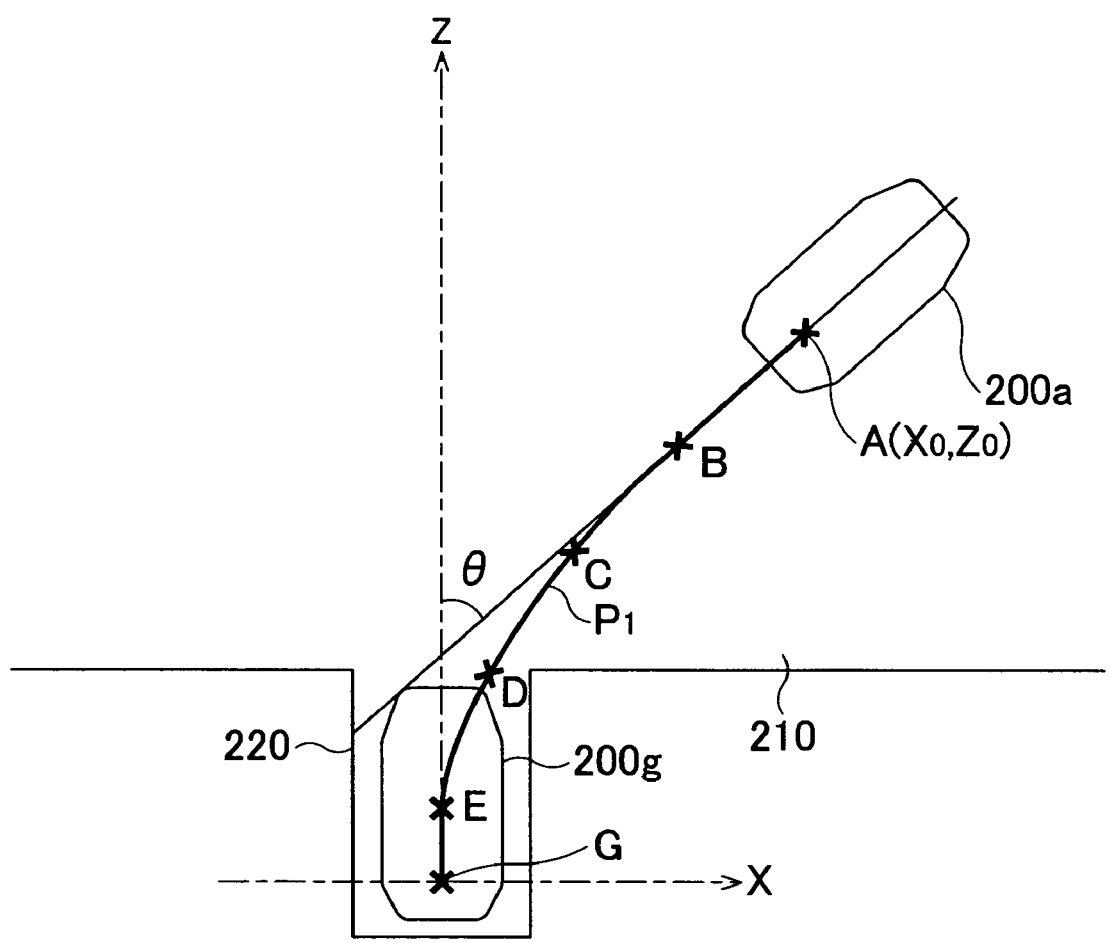
FIG. 2 is a diagram illustrating a garage parking operation that is a parking assist in a first control form of the apparatus shown in FIG. 1.
Figure 3:
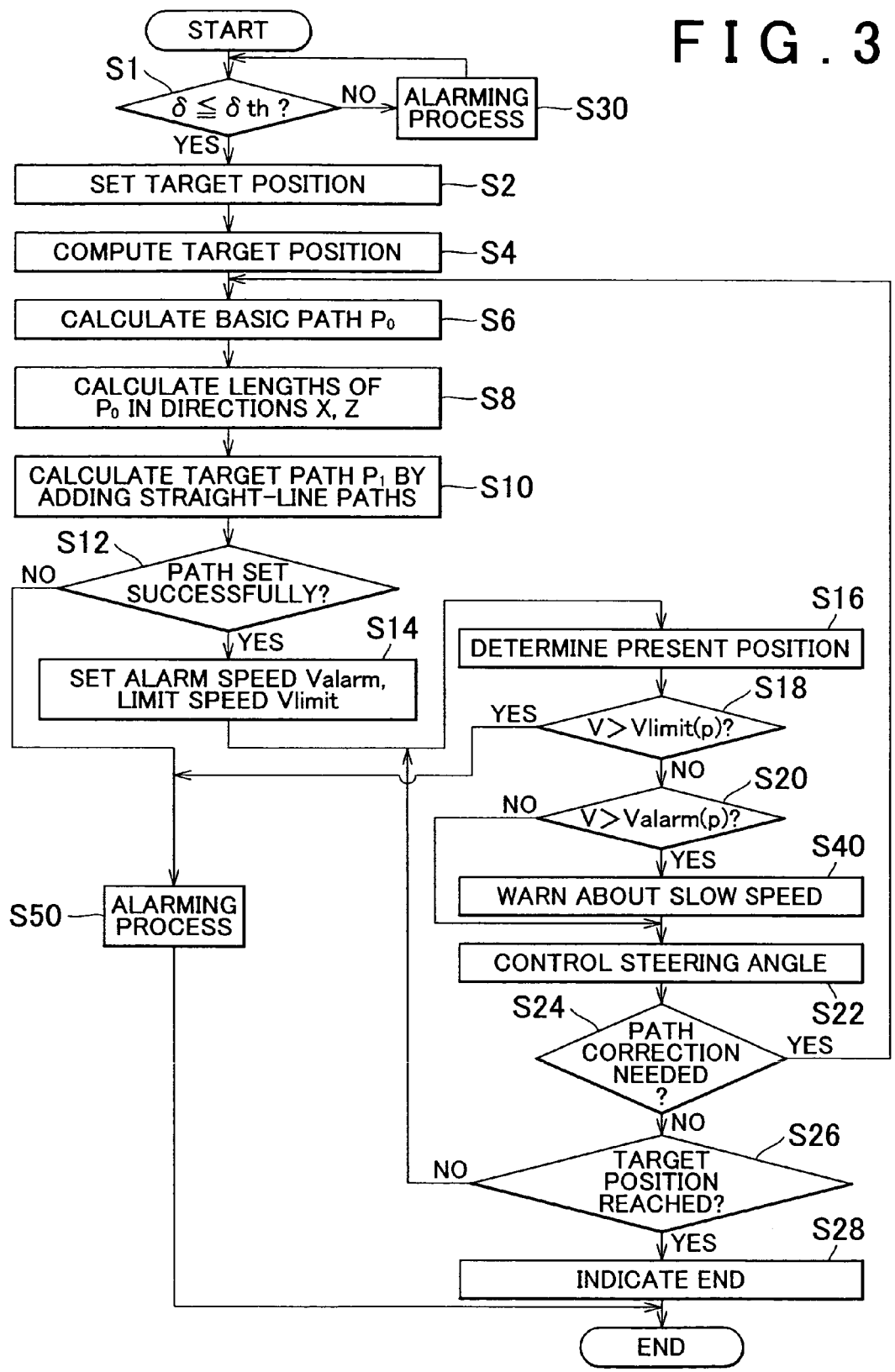
FIG. 3 is a flowchart illustrating a control in the first control form of the apparatus shown in FIG. 1.
Figure 4:
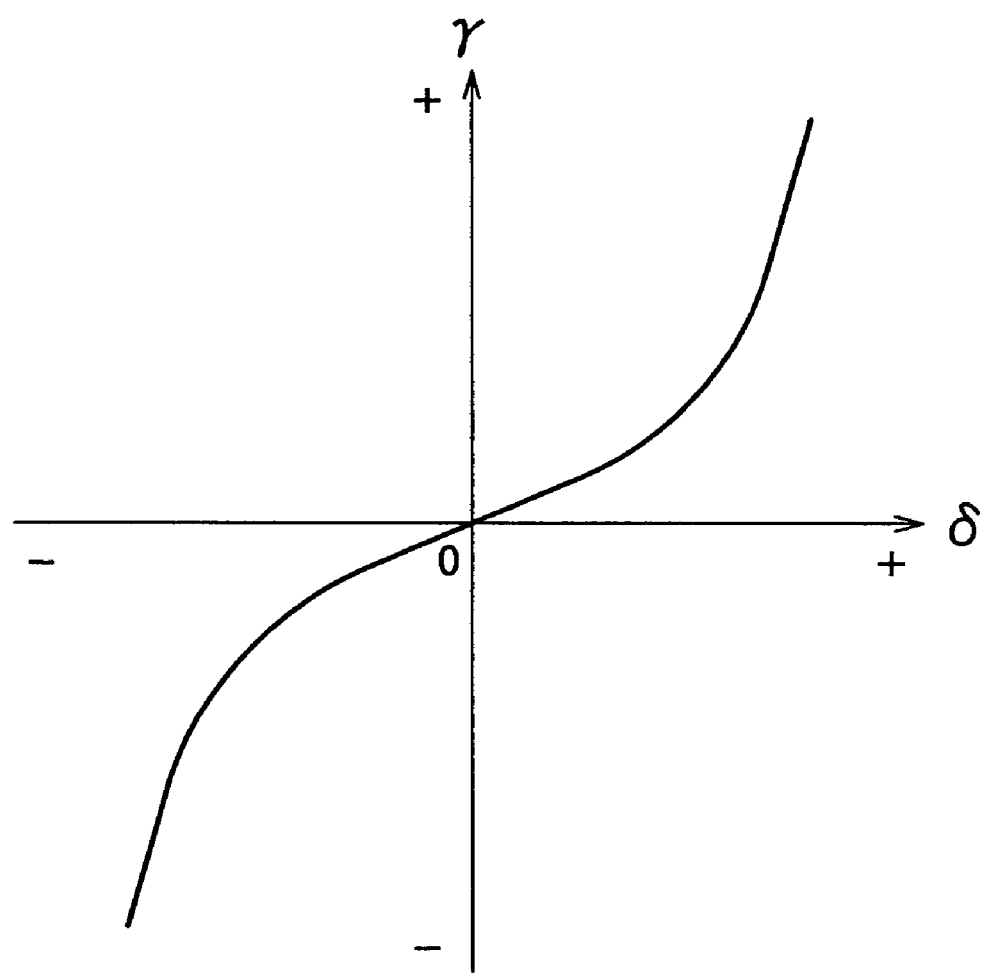
FIG. 4 is a diagram indicating a relationship between the steering angle δ and the turning curvature γ in the apparatus shown in FIG. 1.
Figure 5A:
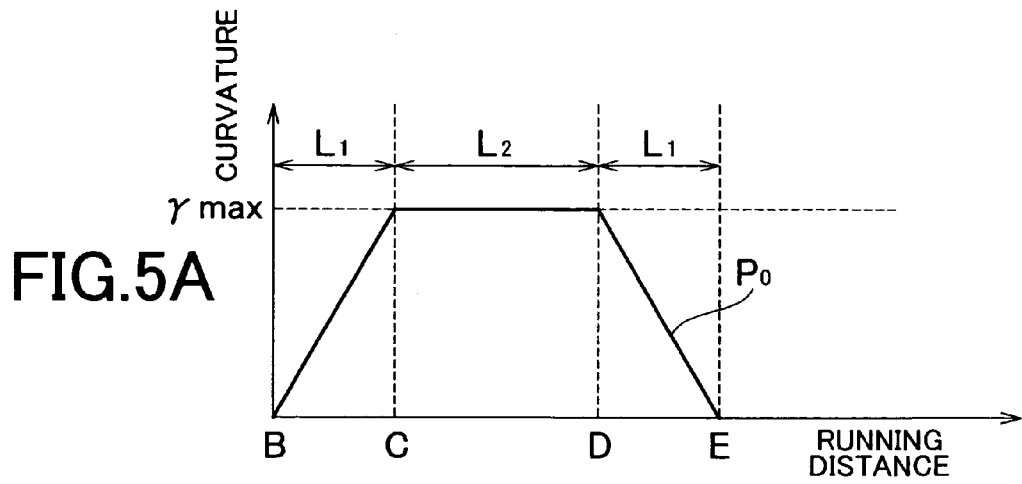
FIGS. 5A to 5C are graphs regarding the turning curvature, the alarm speed and the limit speed with respect to the running distance on an assist path set by the control form illustrated in FIG. 3.
Figure 5B:
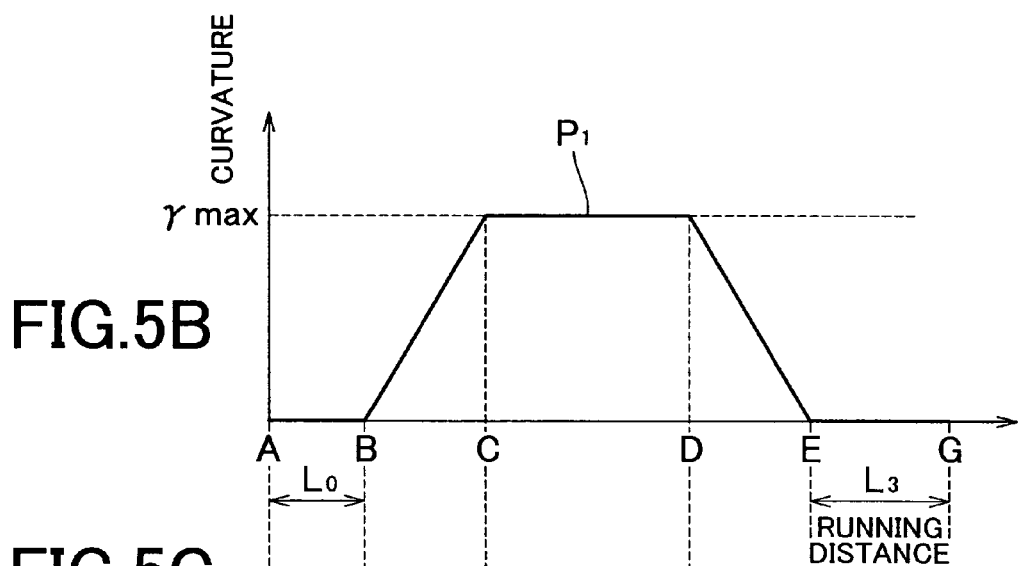
Figure 5C:
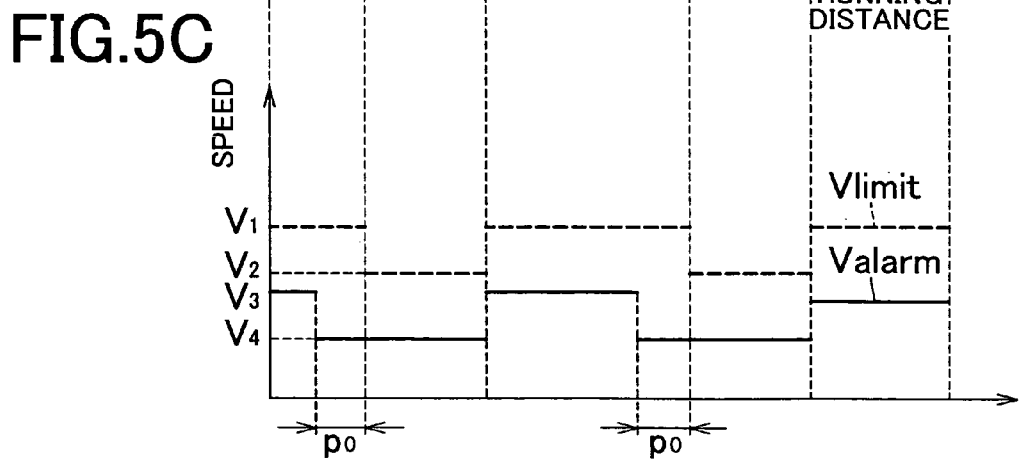

Next, assist operations of the parking assist apparatus will be specifically described. Firstly, a first control form of assist operation will be described. In the first control form, an assist is performed for a generally termed garage parking operation as illustrated in FIG. 2 where a vehicle 200 is backed into a garage 220 that faces a road 210. FIG. 3 is a flowchart of a control in the first control form. FIG. 4 is a diagram indicating a relationship between the steering angle and the turning curvature in this apparatus. FIGS. 5A to 5C are graphs regarding the turning curvature, the alarm speed and the limit speed with respect to the running distance on an assist path set in this control.

The control illustrated in FIG. 3 is started after the output of a command for the parking assist ECU 1 to start the parking assist following a driver's operation of the input means 31, and continues to be executed by the parking assist ECU 1 until: i) the vehicle reaches the vicinity of a specified target parking position, or ii) it is determined that the vehicle cannot reach the target parking position by a single backing run. This control continues unless the assist operation is cancelled by a driver using the input means 31.

Specifically, a driver moves the vehicle to an arbitrary start position of parking assist, and recognizes a target position in a rearward image taken by the back camera 32 and displayed in the monitor 34. After that, the driver operates the input means 31 so as to start the parking assist control illustrated in FIG. 3. If the target position is not seen in the display screen of the monitor 34, the driver moves the vehicle to a position where the target position can be seen in the display screen, and then start the assist. In the description below, it is assumed that a reference point of the vehicle 200 at the start position of the parking assist is a point A. The reference point A may be at other positions, for example, a center of a rear end of the vehicle, the center of gravity thereof, a front end of a side portion, a rear end of a side portion, etc. The vehicle being at the reference point A is indicated by 200a.

The parking assist ECU 1 compares the absolute value of the steering angle δ from an output of the steering angle sensor 23 with a threshold value δth (step S1). If the steering angle δ is less than or equal to the threshold value δth, and is therefore sufficiently small, the parking assist ECU 1 determines that the vehicle is in a neutral steering angle state, and permits transition to a parking assist control. Subsequently, the process proceeds to step S2. As indicated in FIG. 4, in a region of and around the neutral steering angle state, the amount of turn of the steering tire wheels 25, that is, the curvature γ, is set small with respect to the steering angle δ, that is, the amount of rotation of the steering wheel 22 and the steering shaft 21. Therefore, it is appropriate to set the threshold value δth so as to prescribe a range where the curvature γ is substantially 0. For example, the threshold value δth is set at about 15 degrees. Conversely, if it is determined in step S1 that the steering angle is not in the neutral state, the process proceeds to step S30. In step S30, it is indicated to a driver via the speaker 33 and the monitor 34 that the steering angle is outside the control range. In this case, the parking assist ECU 1 prompts the driver to operate the steering wheel 22 so as to return it to the neutral steering angle state. After that, the process returns to step S1. Therefore, if the driver returns the steering angle substantially to the neutral state by a stationary steering operation or the like, the process changes to the parking assist control.

In step S2, the driver operates the input means 31 while watching a back camera 32-taken image displayed in the monitor 34. At this time, the driver sets a target parking position by moving a displayed parking frame to the target parking position in the display screen.

Through an image recognition process, the parking assist ECU 1 determines a vehicle position 200g at the target parking position, more specifically, the position of the reference point G and the direction of the vehicle at the position of the reference point G (step S4).

The position of the point G can be determined, for example, as relative coordinates with respect to the reference point A at the present vehicle position. The following description will be made with reference to a coordinate system as shown in FIG. 2 where the target position G is defined at the origin, and the direction of the vehicle at the target position is defined as the direction of the Z axis, and the direction perpendicular thereto is defined as the direction of the X axis. Hereinafter, the angle of the present direction of the vehicle with respect to the Z axis will be termed deflection angle θ. Furthermore, the position of the point A is expressed by coordinates $(x_0, z_0)$.

Next, a shortest path (hereinafter, referred to as "basic path") $P_0$ that is needed in order to reduce the deflection angle θ to zero is computed from the present position (initial position point A), the present deflection angle $\theta_0$ and the present steering angle δ (step S6).

This running locus $P_0$ is set as changes in the curvature of turn (=the reciprocal of the radius of turn) with respect to the distance of run. FIG. 5A shows a running distance-turning curvature graph of the shortest path $P_0$.

The shortest path $P_0$ includes a path where the steering angle is increased (First path), a path where the increased steering angle is maintained (Second path), and a path where the steering angle is returned to neutral (Third path). In each one of the first path and the third path, the amount of change in the turning curvature with respect to the running distance (the rate of change in the turning curvature) is set at a constant value. The rate of change in the turning curvature is set so that even when the vehicle speed is equal to an upper limit value for the driving assist, the amount of change in the turning curvature is less than the amount of change in the curvature achieved by the maximum steering rate of the steering actuator 24. Therefore, a path that allows a steering operation without fail can be computed.

Representative examples of the locus set in this case are as follows. Firstly, the steering angle is increased while the rate of change in the steering angle with respect to the running distance from an initial position point B to a point C is kept at a fixed value. In this case, when the point C is reached, the steering angle and the turning curvature become equal to their respective set maximum values, and the turning radius becomes equal to a set minimum turning radius (Rmin) (curvature $\gamma max=1/Rmin$) (First path). From the point C to a point D, this steering angle (turning curvature, turning radius) is maintained (Second path). From the point D, the steering angle is reduced while the rate of change in the steering angle with respect to the running distance is kept constant. In this case, the steering angle changes to the neutral state, that is, the steering angle of O, when a point E is reached (Third path). The running locus P forms a clothoid curve where a section BC is an arc having a radius of Rmin, and a section CD is a curve having a curvature of $\gamma_0$ at an end and a curvature of 1/Rmin at the other end, and a section DE is a curve having a curvature of 1/Rmin at an end and a curvature of $\theta$ at the other end.

In some cases where the deflection angle $\theta$ is small, the running locus has no arc section. The amount of change $\Delta\theta$ in the deflection angle $\theta$ in the section BC is expressed as in equation (1).

$$\Delta\theta = \int_B^E \gamma(p)dp \quad (1)$$

In equation (1), $\gamma(p)$ represents the curvature at a running distance p. That is, the amount of change $\Delta\theta$ in the deflection angle equals an area $S_0$ indicated in FIG. 5A. This area can be expressed by $\gamma max \times (L_1+L_2)$ where $L_1$ is the path length of the section BC (the path length of the section DE is also $L_1$) and $L_2$ is the path length of the section CD, if the path includes an arc section. If $\Delta\theta$ is small, the area can be expressed by $L_1 \times \omega^2$ provided that the amount of change in curvature with respect to the running distance is constant at $\omega$ during increase, and at $-\omega$ during decrease. Therefore, a path can be determined by simple computation.

Next, the length of the basic path $P_0$ in the direction X and the length thereof in the direction Z are determined (step S8). The lengths Xf, Zf of the basic path $P_0$ in the directions X, Z can be determined as in equations (2) and (3).

$$Xf = \int_B^E \sin(\theta(p))dp \quad (2)$$

$$Zf = \int_B^E \cos(\theta(p))dp \quad (3)$$

In these equations, $\theta(p)$ is the deflection angle at a running distance p.

Subsequently, straight-line paths are added to the basic path $P_0$ so as to set a target path $P_1$ (step S10).

Figure 6:
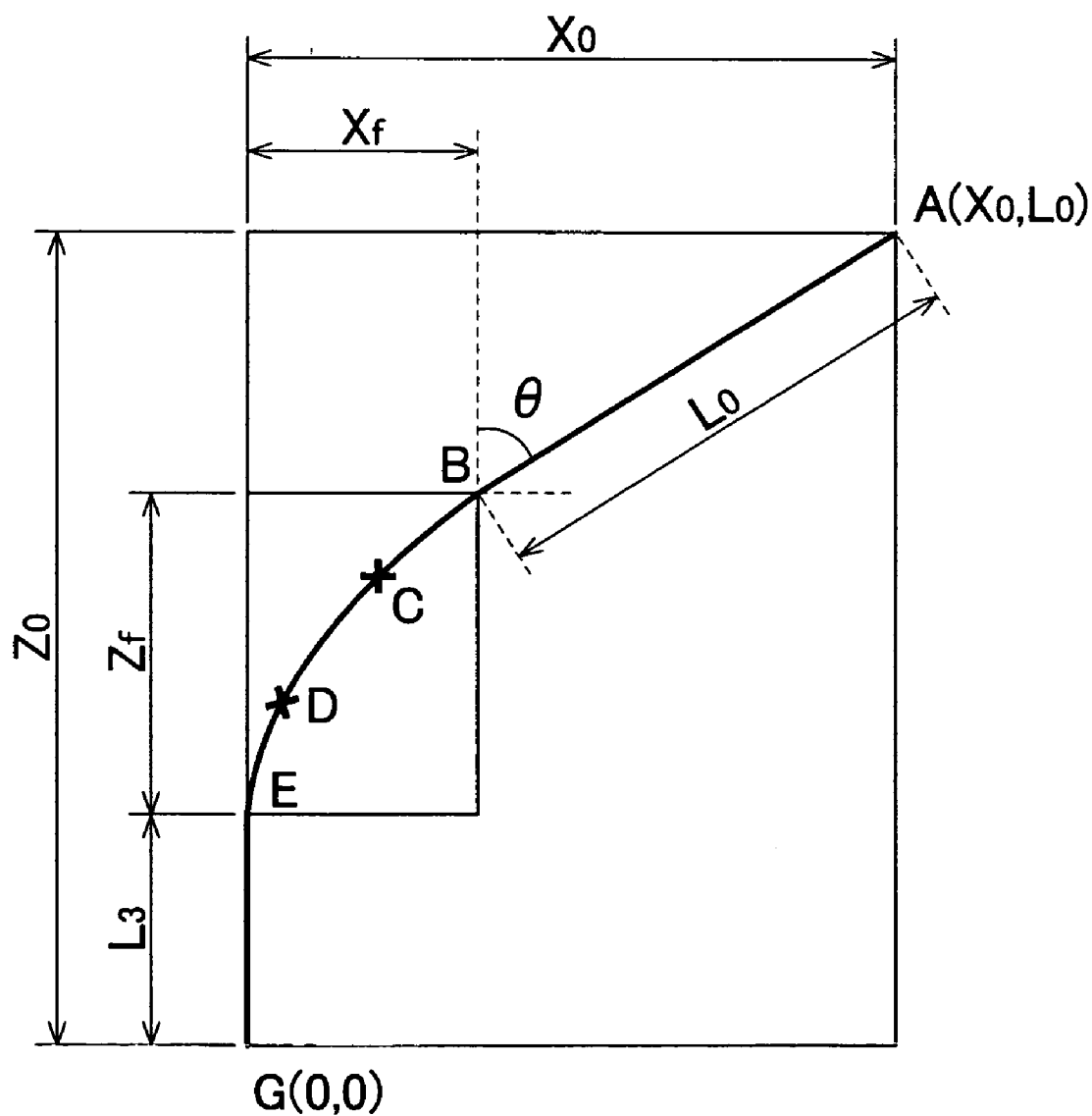
FIG. 6 is a diagram illustrating an assist path set by the control form illustrated in FIG. 3 together with a positional relationship between a vehicle and the target position.

That is, as indicated in FIG. 6, extensions are added to the two opposite ends of the basic path $P_0$ so as to provide a path extending from the point A to the point G. Specifically, when the path length of the straight-line path from the point A to the starting point B of the basic path $P_0$ is represented by $L_0$ and the path length of the straight-line path from the end point E of the basic path $P_0$ to the point G is represented by $L_3$, the following equations (4) and (5) hold.

$$X_0 = L_0 \times \sin\theta_0 + Xf \quad (4)$$

$$Z_0 = L_0 \times \cos\theta_0 + Zf + L_3 \quad (5)$$

Since all the terms except $L_0$ and $L_3$ are known, $L_0$ and $L_3$ can easily be determined from equations (4) and (5).

FIG. 5B indicates the correspondence of the curvature to the running distance along the target path $P_1$ set as described above. FIG. 6 indicates a locus defined by the target path $P_1$. As for the path $P_1$, the target path is independent of the speed of the vehicle and the acceleration thereof. Therefore, an advantage is that the control for following the path during the driving of the vehicle can be simplified.

Subsequently in step S12, it is determined whether a path has been set successfully.

Specifically, it is determined that a path has been set, if neither one of $L_0$ and $L_3$ is negative, that is, if $L_0$ and $L_3$ are 0 or positive. The case where $L_0$ is negative means a case where the length Xf of the basic path $P_0$ in the direction X is greater than the distance ($x_0$) between the point A and the point G in the direction X. The case where $L_3$ is negative is a case where the length Zf of the basic path $P_0$ in the direction Z is greater than a length obtained by subtracting the length $L_0 \times \sin\theta$ of the initial straight-line path in the direction Z from the distance $z_0$ between the point A and the point G in the direction Z. If it is determined in step S12 that it is not possible to properly set a path that reaches the target position point G from the point A, the process proceeds to step S50. In step S50, it is indicated to the driver via the monitor 34 and the speaker 33 that the vehicle cannot reach the target position point G from the present point A. After that, the process ends. The driver can initiate the parking assist operation again after moving the vehicle 200 if necessary.

Next, alarm speeds Valarm and limit speeds Vlimit of the vehicle at various positions on the locus of run are set on the basis of the set target locus of run (step S14).

The alarm speed Valarm is a vehicle speed threshold value for instructing the driver to slow down via the speaker 33 and the monitor 34 if the vehicle speed exceeds this value. The limit speed Vlimit is a vehicle speed threshold value for stopping the control if the vehicle speed exceeds this value. Therefore, the alarm speed and the limit speed are set so that Vlimit>Valarm holds.

This embodiment is characterized in that the alarm speed Valarm and the limit speed Vlimit are changed in accordance with a set path. When the amount of change (d$\gamma$/dp) of the turning curvature $\gamma$ with respect to unit running distance of the vehicle at the position of a running distance p from the initial position is defined as turning curvature rate $\omega(p)$, the limit speed Vlimit(p) and the alarm speed Valarm(p) at the running distance p are expressed as in the following equations (6) and (7).

$$Vlimit(p) = \begin{cases} V_1 & \omega(p) = 0 \\ V_2 & \omega(p) \neq 0 \end{cases} \quad (7)$$

$$Valarm(p) = \begin{cases} V_3 & \omega(p) = 0 \text{ and } \omega(p + p_0) = 0 \\ V_4 & \omega(p) \neq 0 \text{ or } \omega(p + p_0) \neq 0 \end{cases}$$

In the equations, $V_1$, $V_2$, $V_3$ and $V_4$ are set so that $V_1 > V_2$ and $V_3 > V_4$.

Relationships between the running distance p on the target locus of run with the limit speed Vlimit(p) and the alarm speed Valarm(p) are indicated in FIG. 5C. Specifically, the limit speed Vlimit(p) is set at a relatively high vehicle speed $V_1$ in cases (fixed steer regions) where the turning curvature $\gamma$ is constant, that is, the steering is not changed ($\omega(p)=0$). Conversely, in cases (changing steer regions) where the turning curvature $\gamma$ is changed, that is, the steering is being changed ($\omega(p) \neq 0$), the limit speed Vlimit(p) is set at $V_2$ that is lower than $V_1$. The vehicle speed value $V_2$ is set such that as long as the actual vehicle speed is less than or equal to the value $V_2$, the set turning curvature rate maximum value $\omega$max can be achieved sufficiently by a steering rate that is less than or equal to the maximum rate that can be achieved by the steering actuator 24. The vehicle speed value $V_1$ is set higher than $V_2$. The alarm speed Valarm(p) is set at $V_4$ during periods from a predetermined distance ($p_0$) prior to a start of steering to the end of the steering, $V_4$ being lower than an alarm speed $V_3$ that is set in the cases other than the aforementioned periods. Although $V_2 > V_3$ in the examples indicated in FIG. 5C, the setting of $V_2 < V_3$ is also possible.

By changing the alarm speed Valarm and the limit speed Vlimit in accordance with the state of steering as described above, the vehicle speed is restrained from exceeding the range of vehicle speed limited by the capacity of the steering actuator 24. Therefore, the driving assist control is reliably executed. While the steering is not being changed, that is, a steering operation is not being performed, the vehicle speed is allowed to become higher than the aforementioned alarm speed, so that the time of travel to the target position can be reduced. Furthermore, since the changing of the alarm speed to the steering operation-purpose reduced value is accomplished at the position of a predetermined distance prior to the start of steering operation, the vehicle speed will become sufficiently low before the steering operation is started. Therefore, controllability improves.

The setting of limit speeds Vlimit and alarm speeds Valarm is followed by an actual assist control that starts at step S16. At this time, it is preferable that when the shift lever is set at the reverse position, the parking assist ECU 1 instruct a drive force system (not shown) to execute an engine torque increase control. The torque increase control is a control of causing a change to a high driving force state (state of increased torque) by operating the engine at a revolution speed that is higher than a normal idling speed. This control expands the range of vehicle speed where a driver can adjust the vehicle speed by using only the brake pedal without operating the accelerator, so as to improve the operability of the vehicle. If the driver operates the brake pedal, the braking force applied to each wheel is adjusted in accordance with the degree of depression of the pedal, and therefore the vehicle speed is correspondingly adjusted.

In the control of guiding the vehicle to the target position, the present position of the vehicle is first determined (step S16).

The present position can be determined on the basis of the movement of a characteristic point in the image taken by the back camera 32. The present position can also be determined on the basis of a change in the running distance based on output signals of the tire wheel speed sensors 41 and the acceleration sensor 42, and a change in the steering angle based on an output signal of the steering angle sensor 23.

Next, the present vehicle speed V is compared with the limit speed Vlimit(p) (step S18).

If it is determined that the vehicle speed V is higher than the limit speed Vlimit(p), the process proceeds to step S50. In step S50, it is indicated to the driver that the vehicle speed is above the set upper limit value, and the assist control is stopped.

Conversely, if it is determined that the present vehicle speed V is less than or equal to the limit speed Vlimit(p), the present vehicle speed V is compared with the alarm speed Valarm(p) (step S20).

If it is determined that the vehicle speed V is higher than the alarm speed Valarm(p), the process proceeds to step S40, in which the driver is prompted to slow down via the speaker 33 and the monitor 34. If it is determined in step S20 that the vehicle speed V is less than or equal to the alarm speed Valarm(p), the process skips step S40.

Then, a steering control is performed so as to obtain the turning curvature set on the basis of the set locus of run, the running distance-turning curvature relation set on the basis of the present position (running distance) determined in step S16 (step S22).

Specifically, the steer control portion 11, while monitoring the output of the steering angle sensor 23, controls the steering actuator 24 so as to drive the steering shaft 21 and change the steering angle of the steering tire wheels 25 to the set steering angle displacement. It is difficult to directly measure the turning curvature $\gamma$. Therefore, a relationship between the steering angle $\delta$ and the turning curvature $\gamma$ of the vehicle may be determined beforehand, and the control may be performed on the basis of the relationship so as to achieve a steering angle $\delta$ corresponding to a desired turning curvature $\gamma$.

Since the vehicle is moved along a target path set as described above, the driver can concentrate on safety-checking surroundings on road and adjusting the vehicle speed. Furthermore, since each wheel receives a braking force corresponding to the amount of depression of the brake pedal accomplished by the driver, the driver can safely decelerate or stop the vehicle even if there exists an obstacle, a pedestrian, or the like on the road.

Furthermore, if the vehicle speed V exceeds the alarm speed Valarm, the driver is prompted to slow down. If the vehicle speed V exceeds the limit speed Vlimit and therefore it is determined that the path guidance by the parking assist apparatus 100 is difficult, the process is stopped. Thus, reliable guidance is possible.

In this embodiment, the limit speed Vlimit for the period of steering operation is set at a value such that the limit of the steering rate of the steering actuator 24 will not be exceeded. Conversely, during a non-steering operation period when the steering actuator 24 is not driven, the limit speed Vlimit is set relatively high, so that the vehicle speed V can be relatively high and the time of travel can be reduced. However, if the vehicle speed becomes high, the steering needed for the run of the vehicle cannot be achieved without an increase in the steering rate of the steering actuator 24. Therefore, the limit speed Vlimit and the alarm speed Valarm during a steering operation are determined on the basis of the steering rate of the steering actuator 24.

Still further, the alarm speed Valarm is reduced at a position of a predetermined distance prior to a position to start steering on a target path, a margin for sufficient deceleration is provided at the steering start position.

For example, a case where the vehicle speed is close to $V_3$ at a postion of a sufficient distance prior to a start of steering will be considered. If in this case the alarm speed Valarm is changed at the time point of starting steering, there is possibility that the vehicle speed will exceed the limit speed Vlimit of $V_2$ due to a downhill slope, variations in the engine output, etc., and therefore the control will be stopped, even though the vehicle speed does not reach the alarm speed Valarm prior to the start of steering.

In contrast, in this embodiment, the alarm speed Valarm is reduced to $V_4$ before steering is started. Therefore, prior to the start of steering, the driver is allowed to reduce the vehicle speed sufficiently below the limit speed Vlimit of $V_2$, so that frequent stops of the control will be avoided. Hence, controllability will improve, and the reliability in reaching the target position will improve.

After the steering control, it is determined whether there is a deviation of the present position from the target path. If there is a great deviation, it is determined that path correction is needed (step S24).

The deviation from the target path can be determined, for example, by accumulating the deviation of the present position from the target position or the deviation of the actual amount of steer from the target amount of steer with respect to the distance of run. If path correction is needed, the process proceeds to step S6, in which a path is set again.

Conversely, if there is only a small deviation from the target path, the process proceeds to step S26, in which it is determined whether the vehicle has reached the vicinity of the target parking position point G.

If it is determined in this step that the target parking position has not been reached, the process returns to step Si 16 in order to continue the assist control. Conversely, if it is determined that the target parking position has been reached, the process proceeds to step S28. In step 28, it is indicated to the driver via the monitor 34 and speaker 33 that the target parking position has been reached. After that, the process ends.

Thus, a basic path is determined, and a straight-line path is added to one of the two ends or each end of the basic path, so as to set a path. Therefore, the algorithm of path computation is simplified. Furthermore, since the calculation is simplified, the computation load is relatively small, and real-time computation can easily be performed by using a reduced computer resource. Furthermore, since there is no accuracy deterioration in calculation, high-accuracy guidance to the target position can be accomplished.

Figure 7:
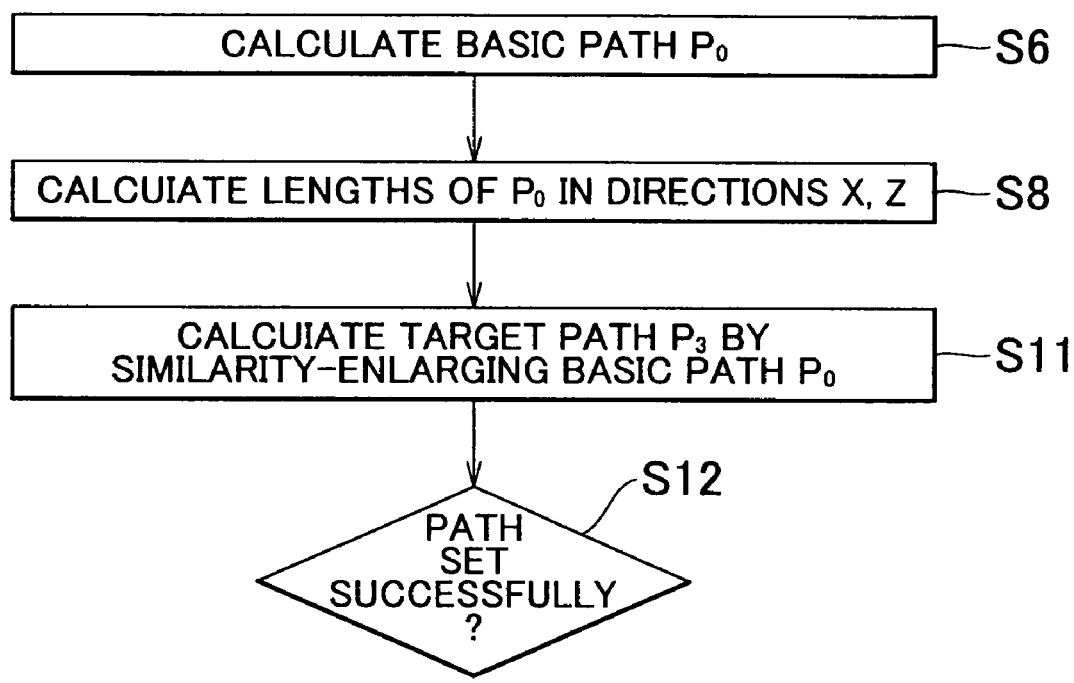
FIG. 7 is a flowchart illustrating a characteristic portion of a second control form of the apparatus shown in FIG. 1.

Next, a second control form of the assist operation will be described. Similar to the foregoing first control form, the second control form is provided for executing garage parking assist. This embodiment differs from the foregoing embodiment only in the method of setting a target path from a basic path $P_0$. Specifically, as illustrated in the flowchart of the setting process in FIG. 7, a target path $P_3$ is generated by adding straight-line paths to a similarity-enlarged path $P_2$ obtained through similarity enlargement of a basic path $P_0$, instead of adding straight-line paths to the basic path $P_0$ (step S11).

Figure 8:
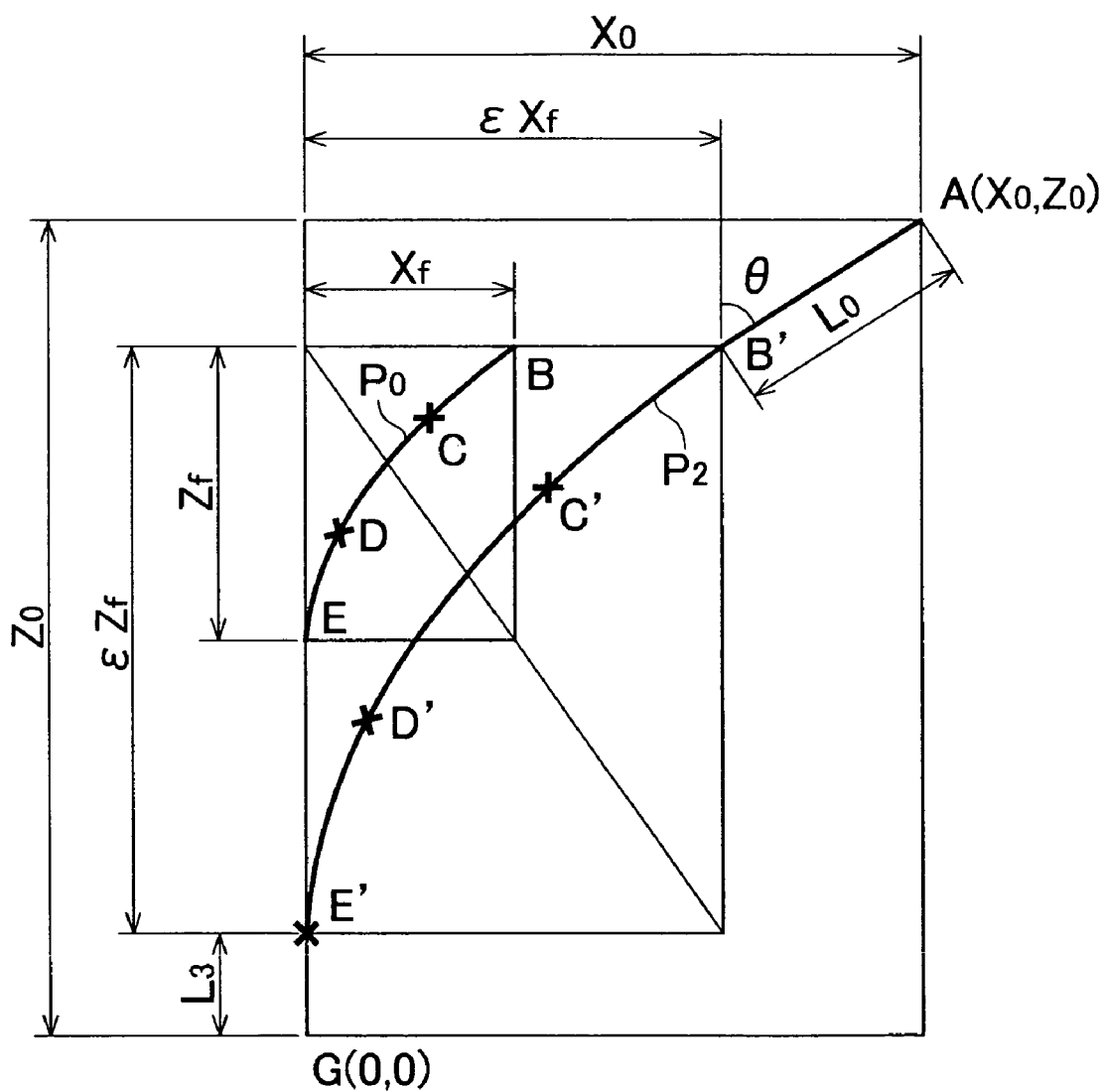
FIG. 8 is a diagram indicating a positional relationship of a path set by the second control form illustrated in FIG. 7.

FIG. 8 indicates a positional relationship of a set path. The scaling factor of the similarity enlargement is represented by E, and the starting point and the end point of the similarity-transformed path $P_2$ are represented by B' and E', respectively. When the path length of the straight-line path from the point A to the point B' is represented by $L_0$ and the path length of the straight-line path from the point E' to the point G is represented by $L_3$, the following equations (8) and (9) hold.

$$x_0 = L_0 \times \sin\theta_0 + \epsilon \times Xf \quad (8)$$

$$z_0 = L_0 \times \cos\theta_0 + \epsilon \times Zf + L_3 \quad (9)$$

As for $\epsilon$, if Zf/Xf is less than or equal to $z_0/x_0$, that is, if the ratio between the length of the basic path $P_0$ in the direction Z and the length thereof in the direction X is less than the ratio between the length of the target path in the direction Z and the length thereof in the direction X, and is elongated laterally (in the direction X), it is appropriate to set $\epsilon$ so as to satisfy $\epsilon \leq x_0/Xf$. Conversely, if the basic path is elongated longitudinally (in the direction Z), the setting of, for example, $\epsilon = x_0/Xf$, causes the end point of the similarity-enlarged path to go beyond the target parking position point G, so that $\epsilon$ needs to be set at a smaller value. In this case, the maximum value of $\epsilon$ is a value that occurs when $L_3$ is 0, and is expressed as in equation (10) based on equations (8) and (9).

$$\varepsilon = \frac{x_0 - z_0 \tan\theta_0}{Xf - Zf \tan\theta_0} \quad (10)$$

The value of $\epsilon$ for use does not need to be the maximum value, but may be an arbitrary value less than that. If the similarity enlargement factor $\epsilon$ is set, the lengths of the straight-line paths can be calculated via equations (8) and (9). Thus, a target path $P_3$ can be set.

Figure 9A:
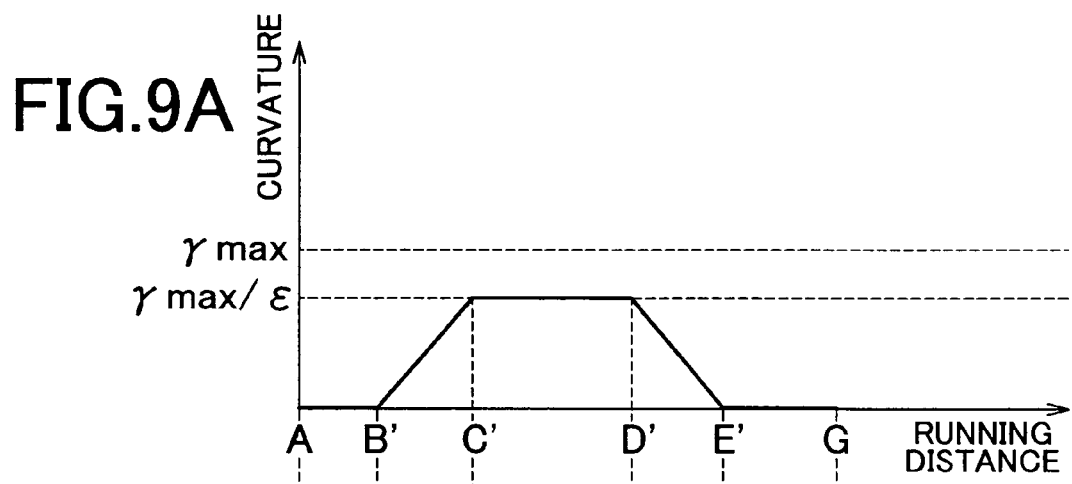
FIGS. 9A and 9B are graphs regarding the turning curvature, the alarm speed and the limit speed with respect to the running distance on an assist path set by the control form illustrated in FIG. 7.
Figure 9B:
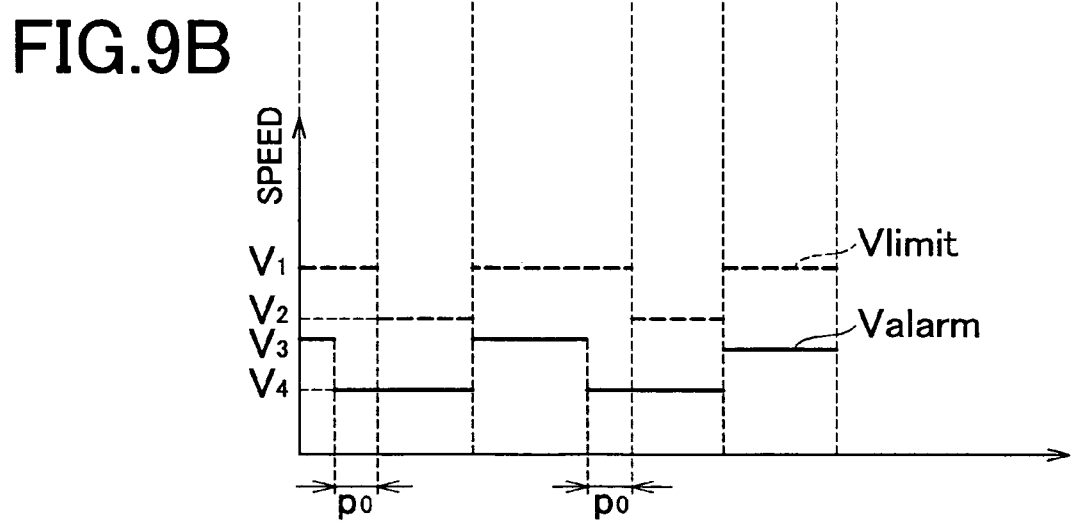

As for the similarity-enlarged path $P_2$ in the target path $P_3$ set as described above, if the curvature at the position of a running distance p from the point A on the basic path $P_0$ is expressed as $\gamma(p)$, the curvature at the position of a running distance $\epsilon p$ from the point A is expressed as $\gamma(p)/\epsilon$. As indicated in FIG. 9A, the similarity-enlarged path $P_2$ is enlarged from the basic path $P_0$ by the ratio of $\epsilon$ in the direction of distance, with compression by the ratio of $1/\epsilon$ in the direction of curvature (enlargement of the turning radius by the ratio of $\epsilon$). Therefore, the area on the running distance-turning curvature graph of the similarity-enlarged path $_2$ is equal to the area on the running distance-turning curvature graph of the basic path $P_0$, so that the amount of change in the deflection angle remains the same. The positions of setting alarm vehicle speed and the limit vehicle speed are also changed in accordance with the similarity-enlarged path.

Through the similarity transformation, the maximum value of the curvature reduces from $\gamma$max on the basic path to $1/\epsilon$ time $\gamma$max, that is, $\gamma$max/$\epsilon$, and the steering rate $\omega$ reduces to $1/\epsilon^2$. As a result, the load on the steering actuator 24 reduces, and the controllability of the steering control improves.

In this embodiment, too, since the limit vehicle speed Vlimit and the alarm vehicle speed Valarm are changed in accordance with a set path, the vehicle speed can be controlled within such a range that the automatic steering apparatus can precisely follow the vehicle speed. Furthermore, due to the similarity transformation, this embodiment is able to limit the steering rate within a lower range than the first embodiment. Therefore, in the second embodiment, the limit vehicle speed Vlimit and the alarm vehicle speed Valarm set for the time of a steering operation can be set to a higher speed side than in the first embodiment. As a result, the time of travel of the vehicle to a target position can be reduced.

In the foregoing embodiments, the alarm vehicle speed is changed prior to the transition to the changing steer region. However, the alarm speed may be changed substantially simultaneously with the transition to the changing steer region in the target path. In this case, it is preferable that the speed value $V_3$ be sufficiently lower than the speed value $V_2$. If the alarm speed is changed prior to the transition to the changing steer region, it is possible to set $V_3$ higher than $V_2$ as mentioned above, that is, the vehicle speed in the changing steer region can be increased.

Furthermore, in the foregoing embodiments, the control is stopped if the upper limit vehicle speed Vlimit is exceeded. It is also possible to install a system in which if the actual vehicle speed is likely to exceed Vlimit, the vehicle speed is controlled so as to be less than or equal to Vlimit by curbing the engine output. Therefore, the vehicle speed can reliably be curbed within a predetermined range, and the vehicle can reliably reach the target position.

In the foregoing embodiments, a basic path is similarity-transformed for garage parking. However, the above-described techniques, if appropriately combined, are basically applicable to the assist in parallel parking and other driving assists.

In the foregoing embodiment, if the initial steering angle (turning curvature) is substantially 0, a path is set, and if the initial steering angle (turning curvature) is great, the setting of a path is not carried out. However, if the initial steering angle is great, it is also possible to instruct the driver to perform stationary steering so as to reduce the initial steering angle substantially to 0. Due to this arrangement, even if the initial steering angle is not substantially 0, the assist control can be continued without a stop. Therefore, the operability during the assist control improves.

Although the basic path may be determined through computation, it is also possible to store quantities of state with respect to the deflection angel θ in the form of maps within the parking assist ECU 1. This arrangement eliminates the need to increase the computing power of the parking assist ECU 1, and allows quicker determination of a path.

The foregoing embodiments are embodiments of the parking assist apparatus having an automatic steering function. However, the invention is applicable not only to the technologies of automatic steering, but is also similarly applicable to technologies of performing steering guidance by indicating appropriate amounts of steer to the driver. Furthermore, the invention is applicable not only to the parking assist apparatus but also to a driving assist apparatus that induces movement in accordance with a path, a lane keep system, etc.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A driving assist apparatus for a vehicle, comprising:
   a computing portion that computes a path that extends from an initial position of the vehicle to a target position of the vehicle and that includes a changing steer region that defines a region where a steering angle is changed during the driving of the vehicle and a fixed steer region that defines a region where the steering angle is fixed so that the steering angle does not change while maintaining a predetermined steering angle during the driving of the vehicle;
   an automatic steering portion that execute automatic steering of the vehicle in order to guide the vehicle along the path to the target position;
   an alarm device that gives an alarm to a driver if a vehicle speed exceeds a predetermined alarm vehicle speed during an operation of the automatic steering portion; and
   an alarm vehicle speed setting portion that sets the alarm vehicle speed,
   wherein the alarm vehicle speed setting portion sets the alarm vehicle speed higher for the fixed steer region than for the changing steer region.

2. The driving assist apparatus according to claim 1, further comprising a switching portion that changes between the alarm vehicle speed for the fixed steer region and the alarm vehicle speed for the changing steer region,
   wherein the switching portion changes the alarm vehicle speed in accordance with the path so that the alarm vehicle speed for the fixed steer region is changed to the alarm vehicle speed for the changing steer region prior to a change from the fixed steer region to the changing steer region.

3. The driving assist apparatus according to claim 1, further comprising a limit vehicle speed setting portion that sets a limit vehicle speed for stopping a driving assist if the vehicle speed exceeds the limit vehicle speed,
   wherein the limit vehicle speed setting portion sets the limit vehicle speed higher than the alarm vehicle speed.

4. The driving assist apparatus according to claim 3, wherein the limit vehicle speed setting portion sets the limit vehicle speed higher for the fixed steer region than for the changing steer region.

5. The driving assist apparatus according to claim 3, wherein the limit vehicle speed setting portion sets the limit vehicle speed for the changing steer region higher than the alarm vehicle speed for the fixed steer region.

6. The driving assist apparatus according to claim 3, wherein the automatic steering portion stops the automatic steering of the vehicle if the vehicle speed exceeds the limit vehicle speed.

7. The driving assist apparatus according to claim 1, wherein the computing portion computes the path if the steering angle at the initial position is substantially 0.

8. The driving assist apparatus according to claim 1, wherein the computing portion computes a basic path that changes a direction of the vehicle from a direction of the vehicle at an initial position to a direction of the vehicle at a target position based on a deflection angle that is an angle formed by the direction of the vehicle at the initial position and the direction of the vehicle at the target position, and an initial actual steering angle that is an actual steering angle of the vehicle at the initial position, and then the computing portion computes the path by similarity-enlarging the basic path.

9. A driving assist method for a vehicle, comprising:
   computing a path that extends from an initial position of the vehicle to a target position of the vehicle and that includes a changing steer region that defines a region where a steering angle is changed during the driving of the vehicle and a fixed steer region that defines a region where the steering angle is fixed so that the steering angle does not change while maintaining a predetermined steering angle during the driving of the vehicle;

executing automatic steering of the vehicle in order to guide the vehicle along the path to the target position;

giving an alarm to a driver if a vehicle speed exceeds a predetermined alarm vehicle speed during an operation of the automatic steering portion; and setting the alarm vehicle speed, wherein the alarm vehicle speed is set higher for the fixed steer region than for the changing steer region.

10. The driving assist method according to claim 9, further comprising the step of changing between the alarm vehicle speed for the fixed steer region and the alarm vehicle speed for the changing steer region, wherein the alarm vehicle speed is changed in accordance with the path so that the alarm vehicle speed for the fixed steer region is changed to the alarm vehicle speed for the changing steer region prior to a change from the fixed steer region to the changing steer region.

11. The driving assist method according to claim 9, further comprising the step of setting a limit vehicle speed for stopping a driving assist if the vehicle speed exceeds the limit vehicle speed, wherein the limit vehicle speed is set higher than the alarm vehicle speed.

12. The driving assist method according to claim 11, wherein the limit vehicle speed is set higher for the fixed steer region than for the changing steer region.

13. The driving assist apparatus according to claim 11, wherein the limit vehicle speed for the changing steer region is set higher than the alarm vehicle speed for the fixed steer region.

14. The driving assist method according to claim 11, wherein the automatic steering of the vehicle is stopped if the vehicle speed exceeds the limit vehicle speed.

15. The driving assist method according to claim 9, wherein the path is computed if the steering angle at the initial position is substantially 0.

16. The driving assist method according to claim 9, wherein the path is computed by computing a basic path that changes a direction of the vehicle from a direction of the vehicle at an initial position to a direction of the vehicle at a target position is computed based on a deflection angle that is an angle formed by the direction of the vehicle at the initial position and the direction of the vehicle at the target position, and an initial actual steering angle that is an actual steering angle of the vehicle at the initial position, and then by similarity-enlarging the basic path.

17. A driving assist apparatus for a vehicles comprising:

computing means for computing a path that extends from an initial position of the vehicle to a target position of the vehicle and that includes a changing steer region that defines a region where a steering angle is changed during the driving of the vehicle and a fixed steer region that defines a region where the steering angle is fixed so that the steering angle does not change while maintaining a predetermined steering angle during the driving of the vehicle;

automatic steering means for executing automatic steering of the vehicle in order to guide the vehicle along the path to the target position;

alarm means for giving an alarm to a driver if a vehicle speed exceeds a predetermined alarm vehicle speed during an operation of the automatic steering means; and alarm vehicle speed setting means for setting the alarm vehicle speed, wherein the alarm vehicle speed setting means sets the alarm vehicle speed higher for the fixed steer region than for the changing steer region.

* * * * *